June 19, 1945.    M. SHUMAN    2,378,662

HYDRAULIC BRAKE

Filed March 20, 1944

INVENTOR:
M. SHUMAN
BY
ATTORNEY.

Patented June 19, 1945

2,378,662

UNITED STATES PATENT OFFICE 2,378,662

HYDRAULIC BRAKE

Moses Shuman, West Los Angeles, Calif.

Application March 20, 1944, Serial No. 527,214

11 Claims. (Cl. 188—79.5)

This invention relates to brakes such as used on the wheels of motor vehicles and has particular reference to means for automatically adjusting such brakes to variations in operating conditions due to wear of the brake lining, heat expansion of the brake drum and other commonly known causes.

Such devices as have come to my notice will gradually undergo automatic readjustment to make up for wearing down of the brake lining, and may in such cases prove satisfactory. But the same devices will also instantly respond to the brake drum expansion, due to overheating, the moment the brake pedal is depressed to set the brake, and they will remain so set. When subsequently the brake drum cools off and shrinks, it is found that this overadjusted mechanism locks the brake.

It is the general object of my invention to provide a simple and inexpensive attachment to the conventional type of brake mechanism and which is capable of such automatic self-adjustment. More particularly, it is the object to provide a mechanism which, under ordinary working conditions will function in the conventional manner but which, under abnormal conditions of wear or excessive expansion due to heat generation will automatically undergo the readjustment necessary in order to assure proper functioning of the brake. It is the further object of the invention to provide means which, when the mechanism has thus automatically become overadjusted, will immediately restore the mechanism to normal functioning upon subsequent operation of the brake.

With these and other objects in view, the invention consists in the combinations hereinafter fully described, particularly pointed out in the appended claims, and illustrated in the accompanying drawing, of which:

Figure 2:
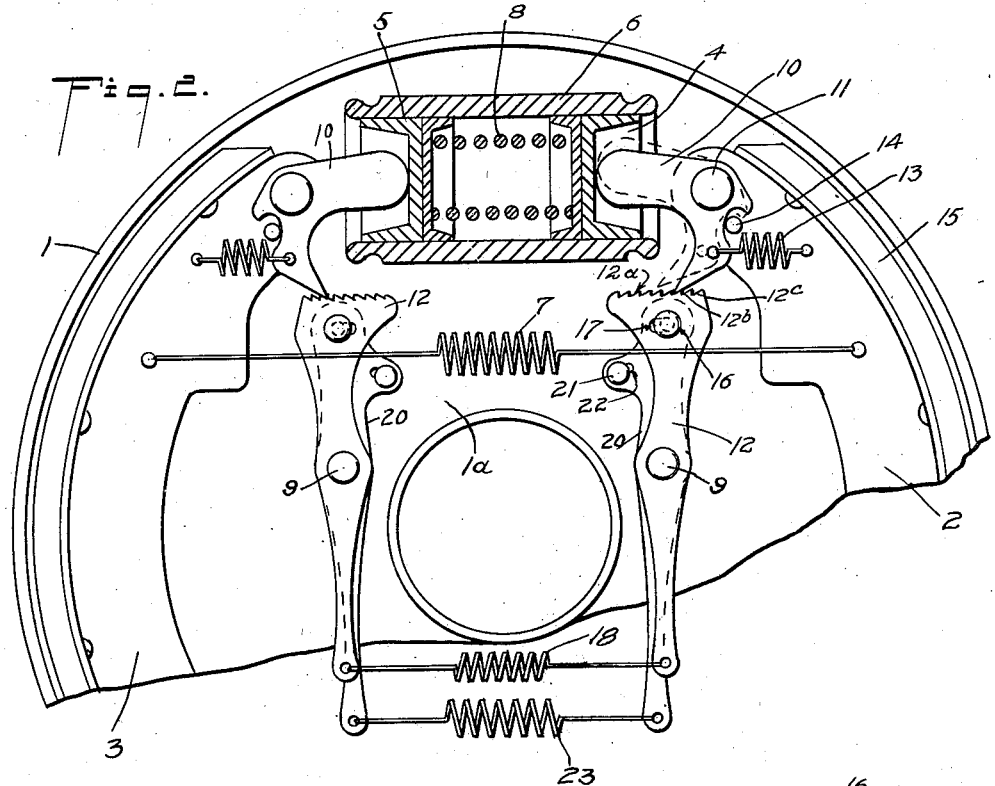
Fig. 2 illustrates, on a larger scale, the upper portion of the device of Fig. 1.
Figure 1:
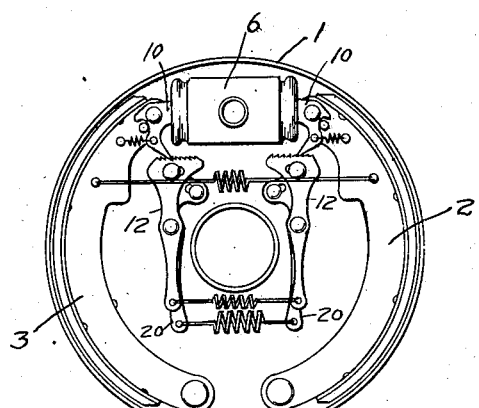
Fig. 1 is a side elevational view of a conventional hydraulic brake mechanism to which the device of the invention is shown attached.

The brake mechanism shown in the drawing is substantially as found in various well known automobiles, comprising a rotatable brake drum 1, within which is journaled a pair of brake shoes 2, 3 on a stationary support 1ª, as usual in practice. The upper ends of the conventional shoes contact pistons 4, 5 of a fluid pressure cylinder 6. A spring 7 urges the shoes against these pistons, and a spring 8 tends to maintain the latter separated, all as in the conventional brake mechanism. It is important to note, however, that in the present structure the upper ends of the brake shoes are not part of the body portion thereof, as in the conventional shoe, but modified by the introduction of a pawl 10, which is pivotally mounted on each shoe at 11. The lower end of this pawl is shaped to engage the teeth 12ª of a lever 12, which is shown pivotally hung on a stud 9 of the stationary support and a spring 13 urges this pawl against a stop 14 to maintain it in this position. As in the conventional brake mechanism, the pressure fluid which is introduced into the cylinder 6 upon depression of the brake pedal forces the shoes apart until the brake lining 15 contacts the inner periphery of the brake drum and continues to exercise increasing pressure until sufficient pressure is developed to overcome the tension of the spring 13, whereupon the pawl is caused to turn on its pivot, substantially into the position shown in dotted outline in Fig. 2, thereby raising the pointed end thereof out of engagement with the teeth 12ª.

The upper end of the lever 12 is, by a spring 18, urged against the pointed end of the pawl 10, and it is made with a slot 17, in which a stud 16 rides. This slot affords substantially the same extent of movement to the lever in the direction of advance movement of the brake shoe that is usually given to the latter, and it is by a spring 18 caused to follow this advance movement of the pawl and shoe. Upon release of the brake pedal, it is found that the pawl instantly enters the notch from which it previously was raised, and that the spring 7, which is much more powerful than the spring 18, returns the parts to their initial positions. It is important to note that the slot 17 is merely long enough to afford the lever 12 this normal operating movement.

Where the brake is properly adjusted, and before the movement of the brake shoes is increased due to wear of the brake lining, the pawl will return each time to the notch from which it rose, but as the lining wears thinner and the brake shoe movement correspondingly increases, and also because the movement of the lever 12 is limited to the normal brake shoe movement, it is found that the pawl may be returned to the next notch 12ᶜ following notch 12ᵇ before the brake shoe pressure is fully relieved. In this manner, it is seen that the brake mechanism readjusts itself to compensate for wear of the brake lining, and this readjusting operation may continue until excessive wear compels replacement of the lining.

At times, however, particularly in hill and mountain sections, it becomes necessary to keep the brake applied for so long a period of time that the drum commences to heat up and expand. The mechanism automatically overadjusts to meet this condition and will continue to function properly until the drum again has contracted in cooling, when it will be found that the brake may become locked for the reason that the slight movement of the lever 12 is not sufficient for complete return movement of the shoes.

If the stud 16 were rigidly mounted in position on the stationary support, it is seen that it would be impossible to free the brake when so locked. However, it is important to note that this stud is mounted on a second lever 20, which also is pivotally hung on the stud 9. A stud 21 of the stationary support is shown seated in a slot 22 of the lever 20, and this slot is long enough to afford the lever movement for release of the locked brake, as will now be described.

A spring 23 maintains the lever 20 in the normal position indicated in Fig. 2, and it is important to note that this spring is powerful enough to overcome the tension of both springs 7 and 18. For this reason, it is found that the spring will maintain the lever 20 in the normal position under all ordinary operating conditions, as if the stud has been part of the stationary support. But, when it is remembered that the spring 13 swings the pawl 10 into engagement with the teeth of the lever 12 the moment pressure on the brake pedal is released, it is seen that the great pressure exerted by the cooling and contracting drum flange against the brake shoe and the pawl 10 is more than sufficient to overcome the tension of the spring 23 and so to swing the lever 20 on its pivot to release the brake. Upon subsequent operation of the brake, after the drum flange has fully contracted, it is found that all the parts will return to the normal position of Fig. 2.

Figure 3:
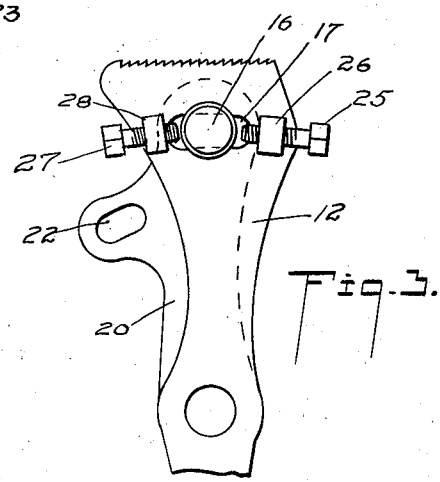
Fig. 3 shows, on a still larger scale, one of the parts of the device in which certain adjustment modifications are embodied.

Because a brake mechanism such as here shown is set to operate within very close limits, it is relatively expensive to manufacture. It is, however, in my device, possible to introduce adjusting means materially reducing manufacturing cost. To this end, I have shown, in Fig. 3, screws 25, 27 seated in bosses 26, 28 of the lever for contact with the head of the stud 16. It is seen that a slight rotation of either or both of these screws will suffice precisely to adjust the device to obtain the proper initial and advanced positions of the parts. It is to be understood, of course, that this adjusting means, where required, should be applied to both levers 12. It is also to be noted that the same adjusting feature may be added to the levers 20, if found necessary.

The drawing is merely illustrative of the invention. The parts have been unduly spread out, their shapes modified and sizes exaggerated, all in order to simplify reading of the drawing. I do, for this reason, not wish to be limited to the exact shapes, proportions or arrangements of parts shown, but reserve the right to embody such modifications as will fall within the scope of the claims hereto appended. Nor is it my intention to limit the device of my invention to use on motor vehicles, but it may be employed wherever such mechanism is adaptable.

I claim:

1. In a hydraulic brake, a brake drum, a stationary support, brake shoes on said support, resilient means for maintaining said shoes retracted, hydraulic shoe advancing means comprising two axially separable pistons, a pawl on each shoe maintained in contact with said pistons by said resilient means, mechanism on the support associated with said pawls capable of automatic overadjustment corresponding to abnormal increase in brake shoe movement, and means for automatically returning said mechanism to position of normal adjustment upon subsequent restoration of normal brake shoe movement.

2. In a hydraulic brake, a rotating brake drum, a stationary support, brake shoes on said support, resilient means for maintaining said shoes retracted, hydraulic shoe advancing means comprising two axially separable pistons, a pawl on each shoe maintained in contact with said pistons by said resilient means, mechanism associated with said pawls capable of automatic readjustment to compensate for increased brake shoe movement due to wear of shoe lining and capable of overadjustment corresponding to abnormal brake shoe movement due to heat expansion of the brake drum, and means for automatically returning said mechanism to position of normal adjustment in response to subsequent restoration of normal brake shoe movement upon cooling and contraction of the brake drum.

3. In a hydraulic brake, a rotating brake drum, a stationary support, brake shoes on said support, resilient means for maintaining said shoes retracted, hydraulic shoe advancing means comprising two axially separable pistons, a pawl on each shoe maintained in contact with said pistons by said resilient means, mechanism associated with said pawls capable of maintaining the pawls and the shoes in any position of overadjustment during periods of excessive heat expansion of the brake drum, said mechanism being capable of automatically returning to position of normal adjustment of the shoes in response to subsequent restoration of normal shoe movement upon cooling and shrinking of the brake drum.

4. In a hydraulic brake, a rotating brake drum, a stationary support, brake shoes on said support, resilient means for maintaining said shoes retracted, hydraulic shoe advancing means comprising two axially separable pistons, a pawl on each shoe maintained in contact with said pistons by said resilient means, a member on said support positioned for engagement by each pawl automatically to maintain each shoe in correct retracted position, to advance each shoe in order to compensate for wear of the lining thereof and to any position of overadjustment during periods of heat expansion of the brake drum, said member being capable of automatic readjustment to return the pawl and brake shoe to position of normal adjustment upon subsequent cooling and shrinking of the drum.

5. In a hydraulic brake, a rotating brake drum, a stationary support, brake shoes on said support, resilient means for maintaining said shoes retracted, hydraulic shoe advancing means comprising two axially separable pistons, a pawl on each shoe maintained in contact with said pistons by said resilient means, a mechanism on the support normally engaged by each pawl automatically to maintain each shoe in normal retracted position and in any position of overadjustment during periods of heat expansion of the drum, said member being capable of automatic readjustment to return the pawl and shoe to position of normal adjustment upon subsequent cooling and shrinking of the drum, and means for adjusting said mechanism to correct any error in normal retracted position of the parts.

6. In a brake mechanism, a brake drum, a stationary support within said drum, brake shoes on said support, resilient means maintaining said shoes retracted, shoe spreading means including two axially separable pistons, brake adjusting means on said support for limited movement in the direction of the brake shoe movement, a pawl on each shoe held by said resilient means in contact with said pistons and having a portion thereof positioned for engagement with said adjusting means to limit return movement of the shoes, and means associated with said brake adjusting means impelled by contraction of the brake drum due to cooling thereof following overheating expansion to increase the return movement of the shoes.

7. In a brake mechanism, in combination with a brake drum, a stationary support within said drum, a brake shoe on said support, resilient means retracting said shoe from the drum, and shoe advancing means including a piston, brake adjusting means comprising, a lever mounted for limited oscillation on said support and having a toothed end surface, and a pawl on the brake shoe abutting said piston and having a portion positioned for engagement with the teeth of said surface to limit return movement of the shoe.

8. In a brake mechanism, the combination with a brake drum, a stationary support within said drum, a brake shoe on said support, resilient means retracting said shoe from the drum and shoe advancing means including a piston, of brake adjusting means comprising, a lever mounted for limited oscillation on said support and having an end surface provided with a row of teeth, a pawl on the brake shoe abutting said piston and made with a portion positioned for engagement with said teeth to limit the return movement of the shoe, and means urging said pawl into engagement with said teeth.

9. In a brake mechanism, the combination with a brake drum, a stationary support within said drum, a brake shoe on said support, resilient means retracting said shoe from the drum and shoe advancing means including a piston, of brake adjusting means comprising, a lever mounted for limited oscillation on said support and having a toothed end surface, a spring urging the lever forward, and a pawl on the shoe abutting said piston and made with a portion shaped to engage the teeth of said surface to return the lever against the tension of said spring thereby to limit the return movement of the shoe.

10. In a brake mechanism, the combination with a brake drum, a stationary support, a brake shoe on said support, resilient means retracting said shoe from the drum, and shoe advancing means including a piston, of brake adjusting means comprising, a lever mounted on a pivot of the support for limited oscillation thereon and having a toothed end surface, a spring urging said lever forward, a second lever hung on the same pivot and mounted for limited oscillation relative to said first named lever, a pawl on the shoe abutting said piston and made with a portion adapted to engage the teeth of said surface to return the first named lever against the tension of its spring, and a spring urging said second lever forward, said last named spring being powerful enough to resist the pressure of the returning brake shoe pawl and first lever but incapable of resisting the additional pressure exerted during brake drum contractions following expansion due to overheating.

11. In a brake mechanism, the combination with a brake drum, a stationary support, a brake shoe on said support, resilient means retracting said shoe from the drum, and shoe advancing means including a piston, of brake adjusting means comprising, a lever mounted on a pivot of the support for limited oscillation thereon and having a toothed end surface, a spring urging said lever forward, a second lever hung on the same pivot and mounted for limited oscillation relative to said first named lever, means for adjusting the position of one lever relative to the other, a pawl on the shoe abutting said piston and made with a portion shaped to engage the teeth of said surface to return the first lever against the tension of its spring, and a spring urging said second lever forward, the last named spring being powerful enough to resist the pressure of the returning shoe the pawl and the first lever but incapable of resisting the additional pressure exerted by the shoe and pawl during brake drum contractions following expansion due to overheating and incidental overadjustment of the brake adjusting means.

MOSES SHUMAN.